(12) United States Patent
Jank et al.

(10) Patent No.: US 12,561,388 B1
(45) Date of Patent: Feb. 24, 2026

(54) ORGANIZATION AND ANALYSIS OF HIGH-SCALE LOW-SIGNAL DATA

(71) Applicant: Palantir Technologies Inc., Denver, CO (US)

(72) Inventors: Angelo Jank, Berlin (DE); Johannes Heilmann, Munich (DE); Josef Korte, Berlin (DE); Lars Carius, Munich (DE)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/206,607

(22) Filed: Jun. 6, 2023

(51) Int. Cl.
| | |
|---|---|
| *G06F 7/00* | (2006.01) |
| *G06F 16/28* | (2019.01) |
| *G06F 16/9537* | (2019.01) |
| *G06F 16/9538* | (2019.01) |

(52) U.S. Cl.
CPC ........ *G06F 16/9538* (2019.01); *G06F 16/288* (2019.01); *G06F 16/289* (2019.01); *G06F 16/9537* (2019.01)

(58) Field of Classification Search
CPC .. G06F 16/9538; G06F 16/288; G06F 16/289; G06F 16/9537
See application file for complete search history.

(56) References Cited

U.S. PATENT DOCUMENTS

| | | | | |
|---|---|---|---|---|
| 5,345,595 A | * | 9/1994 | Johnson | H04M 15/88 |
| | | | | 379/189 |
| 6,249,570 B1 | * | 6/2001 | Glowny | G11B 31/00 |
| 6,385,301 B1 | * | 5/2002 | Nolting | H04M 3/2281 |
| | | | | 379/112.01 |
| 6,405,213 B1 | * | 6/2002 | Layson | G08B 21/0211 |
| | | | | 340/8.1 |
| 6,504,907 B1 | * | 1/2003 | Farris | H04M 3/2281 |
| | | | | 379/7 |
| 6,721,405 B1 | * | 4/2004 | Nolting | H04M 3/2281 |
| | | | | 379/112.01 |
| 7,496,185 B1 | * | 2/2009 | Primavesi | H04M 15/00 |
| | | | | 379/112.01 |
| 8,831,205 B1 | * | 9/2014 | Wu | H04M 3/5233 |
| | | | | 370/352 |

(Continued)

*Primary Examiner* — Mohammed R Uddin
(74) *Attorney, Agent, or Firm* — Sheppard Mullin Richter & Hampton LLP

(57) ABSTRACT
An apparatus, computer-implemented method and computer program are disclosed for organization and analysis of high-scale low-signal (HSLS) data. The method may comprise providing one or more raw datasets representing CDRs and processing the raw datasets to generate an object-relational model comprising a plurality of objects, each object having an object type and properties of the respective object type. The method may also comprise receiving at least a first query comprising, for at least one object type of the object-relational model, at least a first property relating to a first investigation and applying the at least first query to the stored object-relational model to generate a first subset of the CDRs. Responsive to selection of an analysis command, the method may comprise performing a predetermined type of analysis associated with the analysis command on the first subset of CDRs to produce a resultant subset of the CDRs.

19 Claims, 7 Drawing Sheets

(56) References Cited

U.S. PATENT DOCUMENTS

| | | | | |
|---|---|---|---|---|
| 8,924,872 | B1 * | 12/2014 | Bogomolov | G06F 3/0481 |
| | | | | 715/764 |
| 9,672,281 | B1 * | 6/2017 | Kapoor | G06F 8/63 |
| 9,854,450 | B2 * | 12/2017 | Abdullah | H04W 4/02 |
| 10,034,153 | B1 * | 7/2018 | Smith | H04W 4/16 |
| 10,069,972 | B1 * | 9/2018 | Molander | H04M 3/5238 |
| 10,091,349 | B1 * | 10/2018 | Rao | H04M 3/2218 |
| 10,467,193 | B1 * | 11/2019 | Senra | G06F 16/162 |
| 10,572,882 | B2 * | 2/2020 | Li | H04W 68/04 |
| 10,965,807 | B2 * | 3/2021 | Côté | G06N 3/08 |
| 11,509,764 | B1 * | 11/2022 | Salour | H04M 3/54 |
| 2003/0009463 | A1 * | 1/2003 | Gallant | H04M 15/00 |
| 2005/0032527 | A1 * | 2/2005 | Sheha | H04M 1/2746 |
| | | | | 455/457 |
| 2006/0274703 | A1 * | 12/2006 | Connelly | H04L 41/0622 |
| | | | | 370/338 |
| 2007/0071206 | A1 * | 3/2007 | Gainsboro | H04M 3/42221 |
| | | | | 379/168 |
| 2007/0186284 | A1 * | 8/2007 | McConnell | H04L 63/1425 |
| | | | | 726/25 |
| 2008/0021762 | A1 * | 1/2008 | Coon | G06Q 10/06 |
| | | | | 705/7.29 |
| 2008/0045234 | A1 * | 2/2008 | Reed | H04W 4/023 |
| | | | | 455/456.1 |
| 2009/0144102 | A1 * | 6/2009 | Lopez | H04L 63/20 |
| | | | | 705/7.11 |
| 2009/0203352 | A1 * | 8/2009 | Fordon | H04M 15/68 |
| | | | | 455/406 |
| 2011/0184961 | A1 * | 7/2011 | Aertebjerg | H04M 15/58 |
| | | | | 707/754 |
| 2011/0264663 | A1 * | 10/2011 | Verkasalo | G06F 9/455 |
| | | | | 707/E17.014 |
| 2012/0078975 | A1 * | 3/2012 | Chen | G06F 16/24568 |
| | | | | 707/E17.005 |
| 2012/0150888 | A1 * | 6/2012 | Hyatt | G06F 16/9535 |
| | | | | 707/758 |
| 2013/0023247 | A1 * | 1/2013 | Bolon | H04W 4/029 |
| | | | | 455/414.1 |
| 2014/0004892 | A1 * | 1/2014 | Murynets | H04W 4/14 |
| | | | | 455/466 |
| 2014/0032260 | A1 * | 1/2014 | Grindrod | G06Q 30/0201 |
| | | | | 705/7.29 |
| 2014/0136194 | A1 * | 5/2014 | Warford | G10L 25/51 |
| | | | | 704/233 |
| 2014/0337382 | A1 * | 11/2014 | Picht | G06F 16/2474 |
| | | | | 707/777 |
| 2015/0382263 | A1 * | 12/2015 | Jain | H04L 67/00 |
| | | | | 455/432.1 |
| 2016/0036974 | A1 * | 2/2016 | Strom | H04M 3/5116 |
| | | | | 455/404.1 |
| 2016/0037297 | A1 * | 2/2016 | Meriaz | H04W 4/021 |
| | | | | 455/456.3 |
| 2016/0071017 | A1 * | 3/2016 | Adjaoute | G06Q 20/4016 |
| | | | | 706/52 |
| 2017/0111515 | A1 * | 4/2017 | Bandyopadhyay | |
| | | | | H04W 12/128 |
| 2017/0230499 | A1 * | 8/2017 | Mumick | H04W 4/12 |
| 2017/0331946 | A1 * | 11/2017 | Mumick | H04M 15/08 |
| 2019/0268465 | A1 * | 8/2019 | Broidy | G06F 16/685 |
| 2022/0027380 | A1 * | 1/2022 | Martin | G06Q 40/08 |
| 2023/0215525 | A1 * | 7/2023 | Standish | G16H 10/60 |
| | | | | 705/3 |
| 2024/0020292 | A1 * | 1/2024 | Sehra | G06F 16/254 |

* cited by examiner

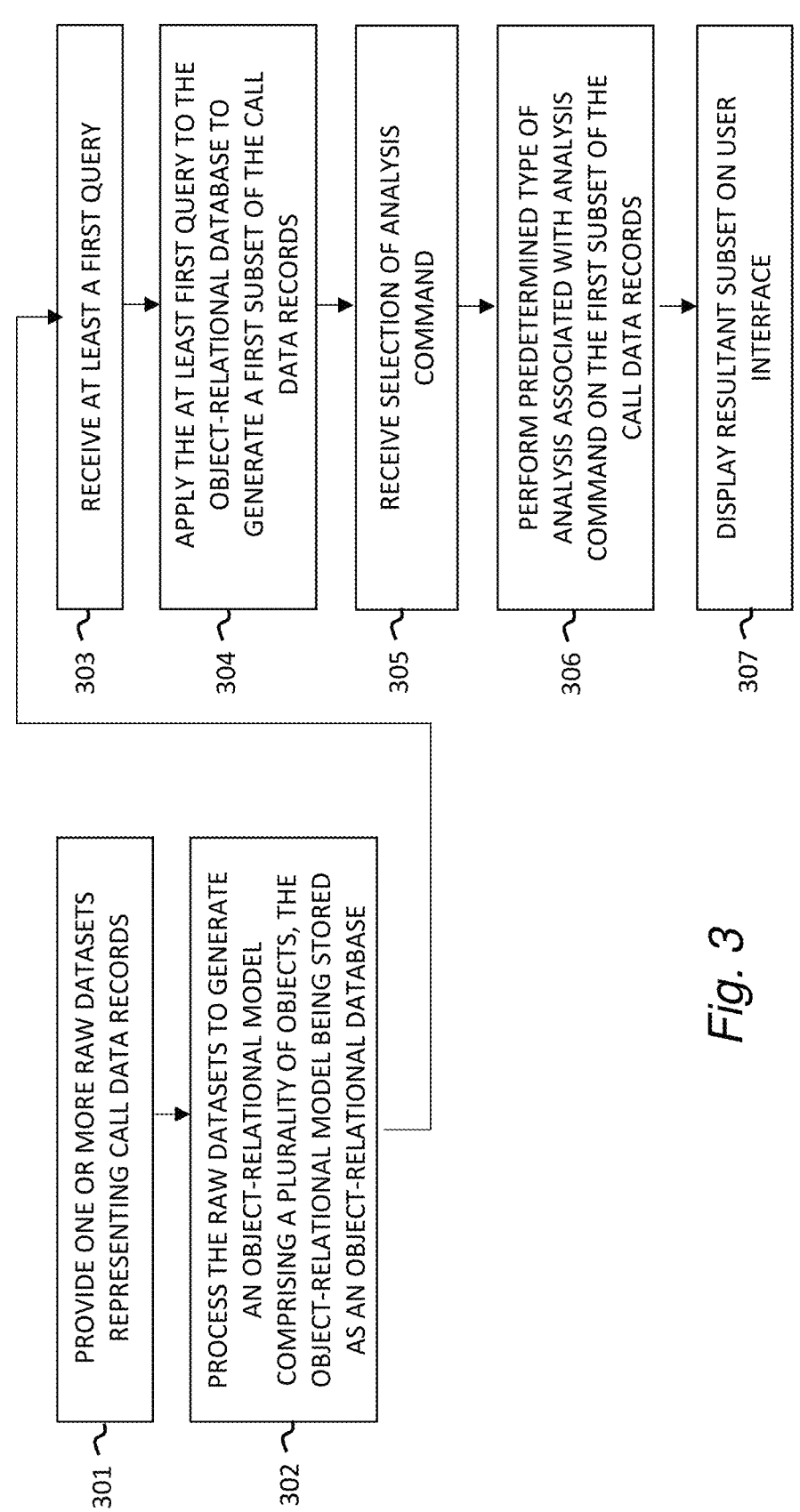

301 — PROVIDE ONE OR MORE RAW DATASETS REPRESENTING CALL DATA RECORDS

302 — PROCESS THE RAW DATASETS TO GENERATE AN OBJECT-RELATIONAL MODEL COMPRISING A PLURALITY OF OBJECTS, THE OBJECT-RELATIONAL MODEL BEING STORED AS AN OBJECT-RELATIONAL DATABASE

303 — RECEIVE AT LEAST A FIRST QUERY

304 — APPLY THE AT LEAST FIRST QUERY TO THE OBJECT-RELATIONAL DATABASE TO GENERATE A FIRST SUBSET OF THE CALL DATA RECORDS

305 — RECEIVE SELECTION OF ANALYSIS COMMAND

306 — PERFORM PREDETERMINED TYPE OF ANALYSIS ASSOCIATED WITH ANALYSIS COMMAND ON THE FIRST SUBSET OF THE CALL DATA RECORDS

307 — DISPLAY RESULTANT SUBSET ON USER INTERFACE

Fig. 3

ORGANIZATION AND ANALYSIS OF HIGH-SCALE LOW-SIGNAL DATA

FIELD OF THE DISCLOSURE

The present disclosure relates to methods, systems and computer programs for organization and analysis of high-scale low-signal (HSLS) data, primarily call data records (CDRs). Example embodiments may enable fast and data-efficient analysis of call data records in relation to one or more investigations.

BACKGROUND

High-scale low-signal (HSLS) data may represent data or data points collected in high volume, e.g. millions or even billions of data points, which individually may have little informative or technical value but collectively may offer interesting insights if appropriately analysed. Call data records (CDRs) are an example of HSLS data. A CDR may represent, for example, an end-to-end connection between, typically, a pair of devices, e.g. user devices such as mobile telephones, and a connection may involve voice calls and/or data messages such as short messaging service (SMS) messages, or other forms of text or media messages which may be transported over a wired or wireless network via one or more network nodes. CDRs may be useful for identifying certain activities. However, analysis of CDRs is typically a very laborious and time-consuming process because the raw data may be provided from multiple sources and/or in an unstructured format. For example, the raw data may comprise an extensible markup language (XML) file having many thousands of rows, each row including data fields particular to the source of the data. Some data sources may provide different data than other data sources.

SUMMARY

According to one aspect, there is described a computer-implemented method, wherein the method is performed using one or more processors, the method comprising:
  providing one or more raw datasets representing CDRs;
  processing the raw datasets to generate an object-relational model comprising a plurality of objects, each object having an object type and properties of the respective object type, and links defining a relationship between the objects, the generated object-relational model being stored as an object-relational database;
  receiving at least a first query comprising, for at least one object type of the object-relational model, at least a first property relating to a first investigation;
  applying the at least first query to the stored object-relational database to generate a first subset of the CDRs;
  responsive to selection of an analysis command, performing a predetermined type of analysis associated with the analysis command on the first subset of CDRs to produce a resultant subset of the CDRs; and
  displaying the resultant subset of the CDRs on a user interface.

In some embodiments, the object-relational model may comprise a call connection object, the call connection object defining properties of call connections between pairs of devices, e.g. user devices, including a first party and a second party.

In some embodiments, the properties of call connections between pairs of devices may include a first party identifier, a first party location, a second party identifier, a second party location and a time identifier for the call connection.

In some embodiments, the first party location and second party location may correspond to a radio access node identifier, e.g. a base station identifier or WiFi access node identifier. In some embodiments, the locations may correspond to a geographic location in terms of coordinates or in terms resolvable to coordinates. From such coordinates, a nearest radio access node may be identified and possibly one or more nearest neighbour radio access nodes.

In some embodiments, the first party identifier and the second party identifier may comprise respective telephone numbers, and wherein the object-relational database provides a subscriber object linked to the call connection object. The subscriber object may provide contact details of subscribers associated with the respective telephone numbers. The contact details may comprise one or more of a name, postal address, email address and other telephone number(s).

In some embodiments, the method may further comprise receiving selection of one or both of the first party identifier and the second party identifier from the resultant subset of the CDRs, retrieving from the subscriber object contact details corresponding to the selection and displaying the contact details on the user interface.

In some embodiments, the received first query may specify at least a first location identifier and a first time period and wherein applying the first query may comprise determining call connections in which:
  at least one of the first party location and the second party location correspond to the at least first location identifier specified in the first query; and
  the time identifier is within the first time period specified in the first query.

In some embodiments, performing the predetermined type of analysis may comprise identifying, from the first subset of the CDRs, call connections in which the first party and the second party swap roles, such that: for a first call connection over a first time period, the first party is a calling or in-cell party and the second party is a called or out-of-cell party, and for a second call connection over a second time period, the second party is the calling or in-cell party and the first party is the out-of-cell or called party, wherein the second time period starts within a predetermined time after the end of the first time period, the identified call connections comprising the resultant subset of the CDRs.

Performing the analysis may further comprise identifying, from the first subset of the CDRs, call connections in which the first party location and the second party location correspond to a common radio access node or geographically neighbouring radio access nodes.

In some embodiments, the object-relational model may comprise a call connection object, the call connection object defining properties of call connections initiated by at least a first device associated with a first party and the properties of call connections include at least a first party identifier, a first party location and a time identifier for the call connection, wherein: the received first query relates to a first investigation, the first query specifying at least a first location identifier and a first time period and applying the first query may comprises determining a first subset of the CDRs comprising call connections in which: the first party location matches the at least first location identifier; and the time identifier is within the first time period.

In some embodiments, the method may further comprise: receiving a second query relating to a second investigation, the second query specifying at least a second location identifier and a second time period and wherein applying the second query comprises determining a second subset of the CDRs comprising call connections in which:

the first party location matches the second location identifier; and the time identifier is within the second time period.

The second location identifier may the same or different than the first location identifier.

In some embodiments, performing the predetermined type of analysis may comprise identifying, from the first subset of the CDRs and the second subset of the CDRs, call connections having at least one of a party identifier and user device identifier common to both the first and second subsets of the CDRs, the identified at least one call connection comprising the resultant subset of the CDRs.

In some embodiments, the first and second investigations may correspond to a common event type. For example, the first and second investigations may generally correspond to criminal investigations instigated by police or security services for which permission to access CDRs is granted by an appropriate authority, e.g. a court, in accordance with conventional lawful procedures. For example, the common event type may be a particular type of crime, e.g. one of murder, robbery, assault etc. There may be a commonality in terms of suspect description or modus operandi.

In some embodiments, performing the predetermined type of analysis may comprise:

identifying, from the first subset of the CDRs, at least a first party as a party-of-interest to the first investigation;

determining, for a plurality of time identifiers, respective location identifiers for the party-of-interest; and presenting a two-dimensional map indicative of a path taken by the party-of-interest for the plurality of time identifiers.

In some embodiments, the properties of the call connections may further include a user device identifier and wherein performing the predetermined type of analysis may comprise:

identifying, from the first subset of the CDRs, call connections in which the first party identifier for a same user device identifier changes within the first time period. The first party identifier may be a telephone number, e.g. IMSI. The user device identifier may be what is known as an International Mobile Equipment Identity (IMEI) code.

According to another aspect, there may be provided a non-transitory computer readable medium comprising instructions that, when executed, cause one or more processors of a computing system to perform:

providing one or more raw datasets representing CDRs;

processing the raw datasets to generate an object-relational model comprising a plurality of objects, each object having an object type and properties of the respective object type, and links defining a relationship between the objects, the generated object-relational model being stored as an object-relational database;

receiving at least a first query comprising, for at least one object type of the object-relational model, at least a first property relating to a first investigation;

applying the at least first query to the stored object-relational model to generate a first subset of the CDRs;

responsive to selection of an analysis command, performing a predetermined type of analysis associated with the analysis command on the first subset of CDRs to produce a resultant subset of the CDRs; and displaying the resultant subset of the CDRs on a user interface.

According to another aspect, there may be provided an apparatus comprising: one or more processors; and a memory storing instructions that, when executed by the one or more processors, cause the system to perform:

providing one or more raw datasets representing CDRs;

processing the raw datasets to generate an object-relational model comprising a plurality of objects, each object having an object type and properties of the respective object type, and links defining a relationship between the objects, the generated object-relational model being stored as an object-relational database;

receiving at least a first query comprising, for at least one object type of the object-relational model, at least a first property relating to a first investigation;

applying the at least first query to the stored object-relational model to generate a first subset of the CDRs;

responsive to selection of an analysis command, performing a predetermined type of analysis associated with the analysis command on the first subset of CDRs to produce a resultant subset of the CDRs; and displaying the resultant subset of the CDRs on a user interface.

According to another aspect, the processors further comprise or are associated with a large language model (LLM) configured to perform the predetermined type of analysis. This LLM may be trained, for example, sequentially, using a first training dataset and a second training dataset. The first training dataset may include examples or scenarios selected based on historical frequency of occurrence and/or likelihood of occurrence. The second training dataset may include examples in which outputs from the LLM were at least partially erroneous, to provide continuous feedback to improve the LLM.

BRIEF DESCRIPTION OF THE DRAWINGS

Example embodiments will now be described by way of non-limiting example with reference to the accompanying drawings, in which:

FIG. 3 is a flow diagram indicating operations according to one or more example embodiments;

DETAILED DESCRIPTION OF CERTAIN EMBODIMENTS

Figure 1:
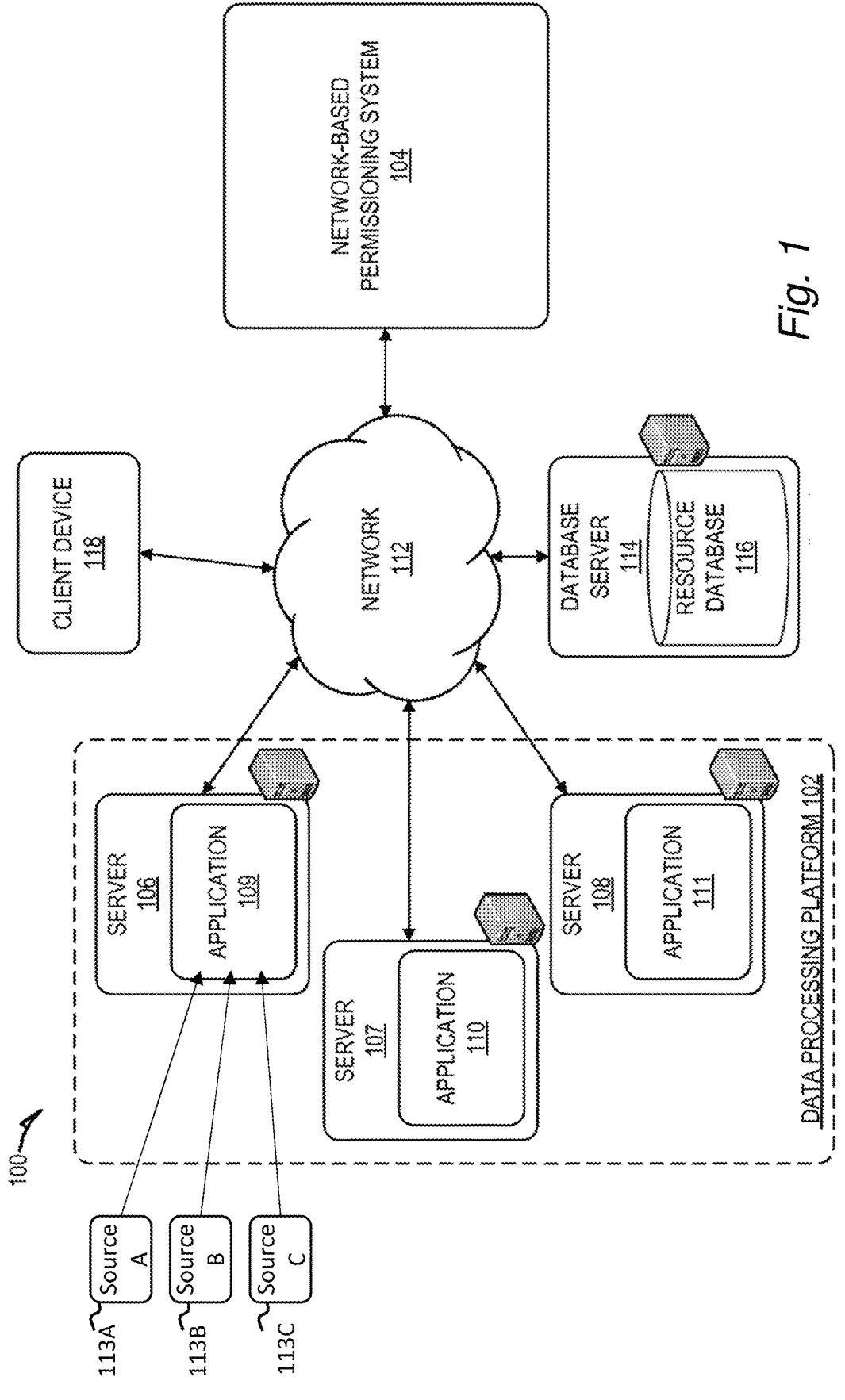
FIG. 1 is a block diagram illustrating a network system comprising a group of application servers of a data processing platform according to some embodiments of this specification.

The present disclosure relates to methods, systems and computer programs for organization and analysis of high-scale low-signal (HSLS) data. Example embodiments may enable fast and data-efficient analysis of HSLS data in relation to one or more investigations. HSLS data may represent data or data points collected in high volume, e.g. millions or even billions of data points, which mostly individually may have little value but collectively may offer interesting insights if appropriately analysed, particularly if the data points that are insightful can be meaningfully extracted. Call data records (CDRs) are an example of HSLS data. CDRs may represent, for example, end-to-end connections between, typically, individual or pairs of devices, e.g. user devices such as mobile telephones, tablet computers, laptops and wearables with communications functionality. For example, a first party individual device logging into, or connecting with, a cell base station for registration with the cell of the network and/or the sending or receiving of text messages or similar via a cell base station may produce respective CDRs. A telephone call between first and second parties may produce a CDR, possibly being represented by a pair of CDRs for individual "legs" of the call. One CDR of the pair may represent what is known as the in-cell party and the other CDR may represent what is known as the out-of-cell party, although the latter may actually be located in the same cell.

A first user device may, for example be a calling device, i.e. that which initiated a call or connection, and a second user device may be a called device, i.e. that which received the call or connection. It is not necessary for a called device to actually accept a call or connection in some cases; the mere fact that calling device signals a connection to a called device may be sufficient for a CDR to be logged.

Calls and connections may involve voice calls and/or data messages such as short messaging service (SMS) messages, text messages and/or media type messages which may be transported over a wired or wireless network via one or more network nodes. Also, there might be data connections that do not necessarily have another device as a recipient. A network node may, for example, comprise a wireless network base station (eNB or gNB), a WiFi access node or similar.

CDRs may be useful for identifying certain activities. However, analysis of CDRs is typically a very laborious and time-consuming process because the raw data may be provided from multiple sources, often in an unstructured format or varying structures. For example, the raw data may comprise an extensible markup language (XML) file having potentially millions if not billions of rows, each row including data particular to the source of the data. Some data sources may provide different data than other data sources.

Example embodiments relate to methods, systems and computer programs for organization and fast and data-efficient analysis of CDRs in relation to one or more investigations. Investigations may be, but are not limited to, criminal investigations instigated by police or security services for which permission to access CDRs is granted by an appropriate authority, e.g. a court, in accordance with conventional lawful procedures.

For example, consider the case where a police service lawfully obtains access to CDRs from one or more network service providers (NSP), possibly for a particular geographic region and time frame, e.g. for a block in City X for the past two months. This may be in response to a spate of particular crimes in that geographic region, e.g. robberies. The obtained CDRs will comprise a huge amount of (un-) structured data, possibly provided in various formats and/or schemas depending on the particular NSP and how they generate their data.

Example embodiments may involve use of a processing pipeline and object-relational data modelling to allow for fast and dynamically adjustable preparation and analysis of such CDRs.

Example embodiments will now be described with reference to the Figures.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to provide a processing pipeline involving ingesting CDRs, generating an object-relational model representing the CDRs for storage as a database, filtering of CDRs, as well as analysis of CDRs data to develop various insights about the data, for example to provide a highly targeted approach where only a relatively small subset of the data records, potentially a single connection among the huge number of CDRs, can be found. To further this example, the network application 109 may be a CDR ingesting system according to some example embodiments for receiving, cleaning, harmonizing and enriching CDRs from one or more raw formats into CDRs that conform with and are represented by an object-relational model which may be defined by an ontology. As shown, the network application 109 may receive CDRs from one, or in this case a plurality of data sources 113A-113C, which may be different communication network providers. In other examples, the plurality of data sources may be a plurality of CDRs in unstructured format, for example a plurality of XML files associated with different investigations. The same, or another network application 110, may be an analysis system according to some example embodiments for receiving one or more queries, for example to filter CDRs down to a smaller number, or first subset of the CDRs and for presenting one or more analysis options relating to a particular type of analysis. The analysis system 110 may also provide one or more user interfaces (UIs) for presenting resulting data, e.g. subsets of the CDRs following filtering, as well as analysis options and other user interactive commands. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organization. One or more other applications (not shown) may be associated with a second, different organization or a different part or entity of the first organization. These other applications may be provided on one or more of the application servers 106, 107, 108 which need not be specific to a particular organization. Where two or more applications are provided on a common server 106-108 (or host), they may be containerised which as mentioned above enables them to share common functions.

Each of the servers 106-108 may be in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may store other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

In example embodiments, the resource database 116 on the database server 114 may be an object-relational database, i.e. one that stores CDRs according to an object-relational model as defined by an ontology. As mentioned above, the network application 109 as part of a processing pipeline may be configured to ingest raw CDRs and perform cleaning, harmonizing and enriching CDRs from one or more raw formats into CDRs that conform to an object-relational model which may be defined by an ontology. As is known, an object-relational database enables efficient storage of data and rapid access to such data by organising, for example, rows of data into different objects, each having an object type with one or more properties. Links or "edges" between the different objects may define relationships. Storing CDRs in an object-relational database may avoid repetition of data and/or enable access to certain data only when required.

As shown, the network system 100 also includes a client device 118 in communication with the data processing platform 102 and the network-based permissioning system 104 over the network 112. The client device 118 communicates and exchanges data with the data processing platform 102.

The client device 118 may be any of a variety of types of devices that include at least a display, a processor, and communication capabilities that provide access to the network 112 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more UIs. The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

In example embodiments, the client device 118 may be used by an analyst for performance of the aforementioned processing pipeline or parts thereof. For example, an analyst may commence ingesting of CDRs using the application 109 and, subsequently, perform one or more filtering and/or analysis commands using the same or a different application 110. In some embodiments, different analysts may perform different operations, for example a first analyst may handle ingesting of CDRs and a second analyst may perform filtering and analysis. In some embodiments, ingesting of CDRs may be performed automatically.

Figure 2:
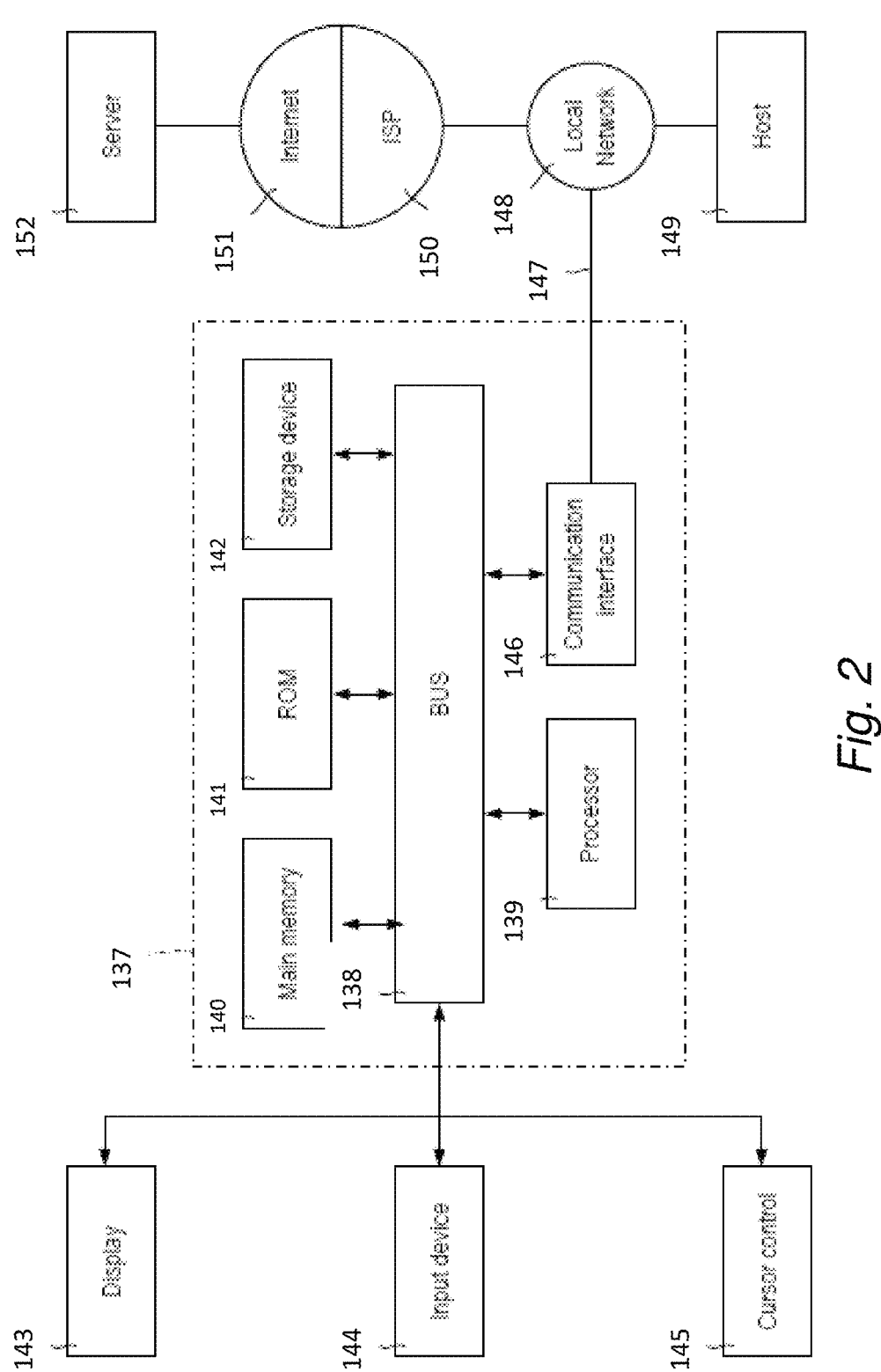
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 140 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

One of said applications 109, 110, 111 or another application may provide an application according to example embodiments. The application may be a stand-alone or web-based platform, the latter being accessible to multiple users at respective different locations.

FIG. 3 is a flow diagram showing processing operations that may be performed according to example embodiments. For example, the processing operations may be performed by one or more of the applications 109-111 shown in FIG. 1. The processing operations may be performed using hardware, software, firmware or a combination thereof. In some embodiments, one or more operations may be omitted and/or reordered. A first operation 301 may comprise providing one or more raw datasets representing CDRs. Providing, in the context, may comprise one or more of receiving, uploading and/or generating. The one or more raw datasets representing the CDRs may, for example, be received from one or more of the sources 113A-113C shown in FIG. 1. The one or more raw datasets may be received from NSPs or from policy or security service personnel. The one or more raw datasets may be provided in the form of one or more XML files or similar.

A second operation 302 may comprise processing the raw datasets to generate an object-relational model comprising a plurality of objects, each object having an object type and properties of the respective object type, and links defining a relationship between the objects, the generated object-relational model being stored as an object-relational database.

A third operation 303 may comprise receiving at least a first query comprising, for at least one object type of the object-relational model, at least a first property pertaining to a first investigation.

A fourth operation 304 may comprise applying the at least first query to the stored object-relational model to generate a first subset of the CDRs.

A fifth operation 305 may comprise receiving selection of an analysis command. The analysis command may be received through a user interface and may be associated with a predetermined type of analysis operation. A plurality of analysis commands may be available and presented on such a user interface, each analysis command associated with respective types of analysis operations, some of which will be described below.

A sixth operation 306 may comprise, responsive to selection of an analysis command, performing a predetermined type of analysis associated with the analysis command on the first subset of CDRs to produce a resultant subset of the CDRs.

A seventh operation 307 may comprise displaying the resultant subset of the CDRs on a user interface. The resultant subset may also be saved as a file and/or data object for transmission to a remote computing device or user.

Figures 4, 5:
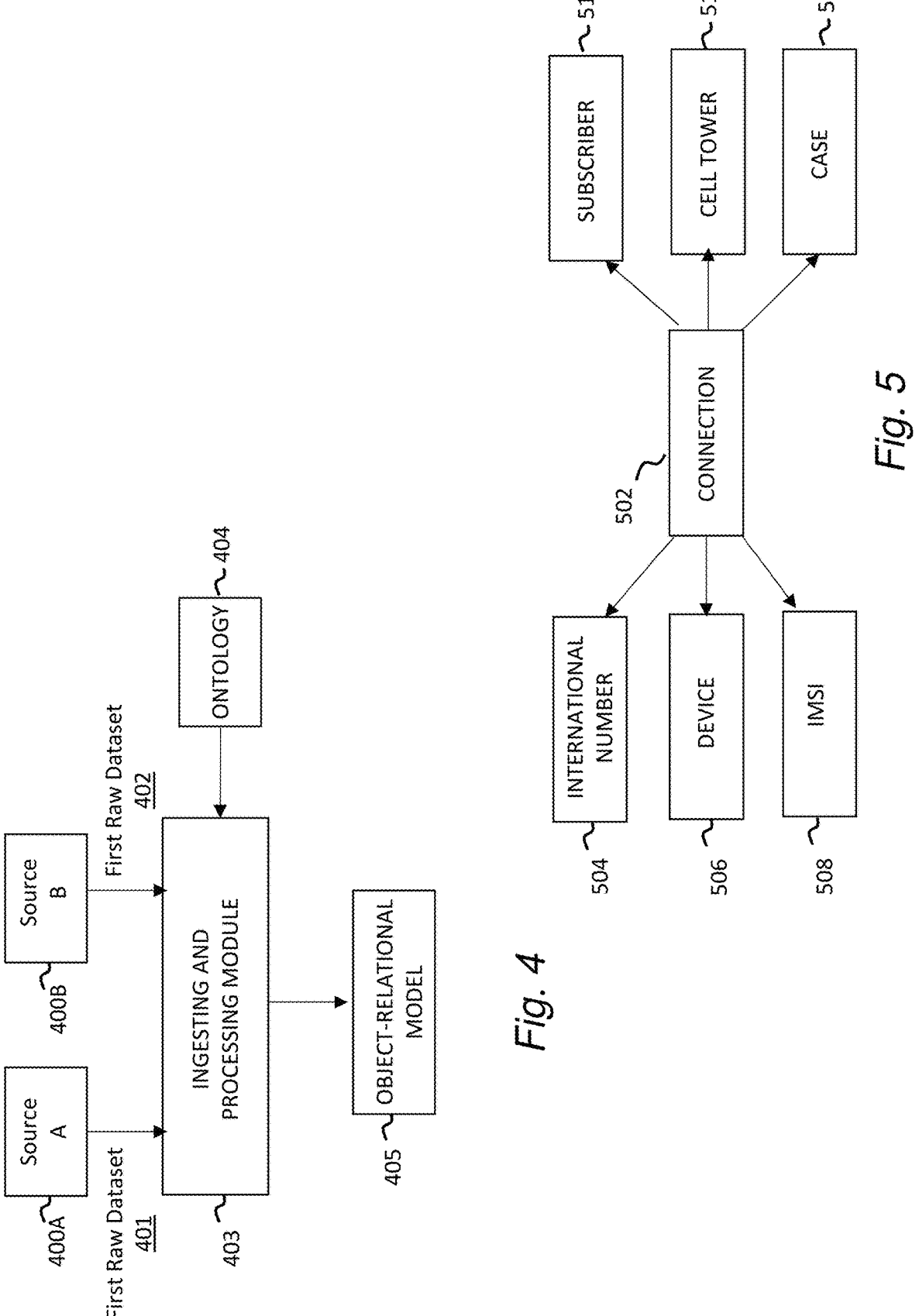
FIG. 4 is a block diagram showing part of a data ingesting pipeline according to one or more example embodiments.
FIG. 5 is a flow diagram indicating an object-relational model representing a call data records according to one or more example embodiments.

The first and second operations 301, 302 may be understood with reference to FIG. 4. It will be seen from FIG. 4 that first and second raw datasets 401, 402 may be respectively received from first and second sources 400A, 400B. The first and second raw datasets 401, 402 may comprise unstructured data from different NSPs which may relate to one or a plurality of investigations, e.g. first and second investigations having respective first and second case identifiers. For example, the first raw dataset 401 may come from a first NSP and may include all calls (the term may encompass data connections as well as voice calls) within a two-month time window for the City X area. For example, the second raw dataset 402 may come from a second NSP and may include all calls within a two (or different) month time window for the City X area, or a larger or smaller area which overlaps the City X area. The first and second raw datasets 401, 402 may alternatively come from the same NSP but relate to difference case identifiers, i.e. different investigations performed by the same or different law enforcement agencies. The first and second raw datasets 401, 402 may come from one or more sources which are not NSPs but which have access to the CDRs, e.g. one or more investigative agencies such as the police.

The first and second raw datasets 401, 402 may be ingested and processed in an ingesting and processing module 403 to provide an object-relational model 405. The provided object-relational model 405 may conform to a predetermined ontology 404.

An ontology may be defined as stored information that provides a data model for storage of data in one or more databases. For example, the stored data may comprise definitions for object types and property types for data in a database, and how objects and properties may be related, e.g. by links or edges. A link may be defined as a connection between two data objects, based on, for example, a relationship, an event, and/or matching properties. Links may be directional or bidirectional.

This processing may comprise actions such as cleaning, harmonizing and enriching the first and second raw datasets 401, 402 to provide a plurality of objects having object types and property types.

Cleaning may involve removing null entries, e.g. individual data points or rows. Harmonizing may involve ensuring data points conform with predetermined types as defined in the ontology, e.g. some types of data points are integers, some have floating point representation, some have particular date and/or time formats. Enriching may involve performing joins or similar.

FIG. 5 shows an example object-relational model 405. A first object 502 may comprise a call connection object, defining properties of call connections between pairs of user devices, for example including a calling party and a called party. Note that a "call" in this context can mean any form of connection, e.g. a voice call, a text message or other form of data message between the user devices. A second object 504 may comprise an international number object, defining a list of international telephone numbers and respective properties thereof. A third object 506 may comprise a device object, defining a list of user device types, e.g. by brand and model number and respective properties thereof. A fourth object 508 may comprise an international mobile subscriber identity (IMSI), defining a list of IMSIs and respective properties thereof. A fifth object 510 may comprise a subscriber object, defining a list comprising one or more of names, postal addresses, email addresses and other telephone number(s). A sixth object 512 may comprise a cell tower object, defining a list of cell tower identifiers as provided by one or more NSPs and respective properties thereof. Properties may comprise, for example, their geographic location, a direction that one or more antennas of the cell tower point towards, etc. A seventh object 514 may comprise a case object, defining a list of investigative cases and respective properties thereof. Different objects may be added to the object-relational model 405 which can be flexibly configured and reconfigured, as needed, to represent CDRs in a data-efficient way.

By organising large numbers of CDRs according to the object-relational model 405, efficient and flexible filtering and analysis processes can be performed. The CDRs organised according to the object-relational model may be stored as a database for access by one or more client applications for querying and/or analysis.

In accordance with the third operation 303 described above, at least a first query may be received. A query may comprise any form of data input that results in filtering of CDRs organised according to the created object-relational model 405 to produce a subset of the CDRs. Multiple queries, e.g. first and second queries, may be received simultaneously or sequentially and processed in any order to produce a refined subset of the CDRs for subsequent analysis.

For example, at least a first query may comprise an input that refers to a case reference, e.g. an alphanumeric code that may relate to a particular investigation associated with a first location identifier and a time identifier. The case reference may, for example, refer directly or indirectly to a saved file or data object which comprises the first location identifier and time identifier. For example, the particular investigation may relate to a robbery carried out at a given location within an approximate time frame. The first location identifier of the first query may comprise a closest cell tower identifier or a set of geographic coordinates resolvable to a closest cell tower via the cell tower object 512 mentioned in relation to FIG. 5. For example, the set of geographic coordinates may be additionally resolvable to a group of neighbouring cell towers relative to the closest cell tower. The time identifier may comprise a time range which includes the approximate time frame in which the robbery took place, but may automatically be modified to include a period of time before and/or after the approximate time frame, e.g. two hours either side.

By receiving the first query in the third operation 303, the CDRs may be filtered down to a subset of the CDRs which correspond, i.e. match or closely match, to the first location identifier and time identifier.

Figure 6:
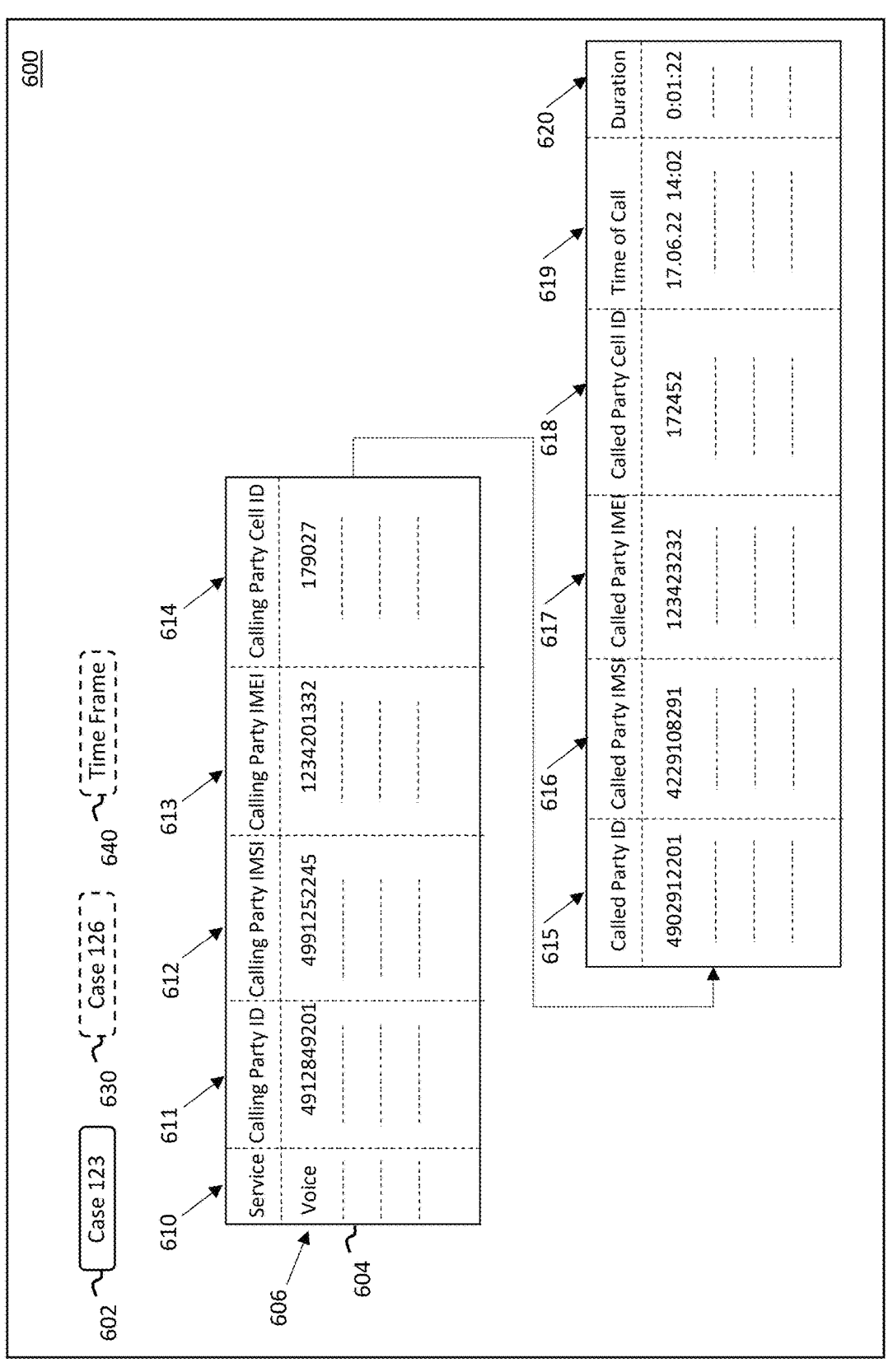
FIG. 6 is a schematic view of a user interface showing partial data resulting from applying at least a first query to a set of call data records.

FIG. 6 is a representational view of a UI 600 showing a set of CDRs 604 resulting from, for example, receiving a first query 602 in the third operation 303 and applying the first query to the object-relational model 405 in accordance with the fourth operation 404. Alternative or additional UIs may be presented which may convey the same or similar information, e.g. using more or less columns. The first query 602 may, for example, be entered in an appropriate filter field in the UI 600 associated with an analysis application provided by one or more of the applications 109-111. The set of CDRs 604 comprise and may be presented as structured data arranged in a tabular format, with each horizontal row comprising a respective connection and each vertical column representing a respective field populated with data based on the applied ontology 404. The representational view is merely an example and fewer or a greater number of fields may be presented.

A first field 610 may represent a service identifier, e.g. whether the connection is a voice call, an SMS or a data connection. A second field 611 may represent a first, or calling party identifier, e.g. a telephone number associated with the calling device that triggered the connection. This may be populated using the international number object 504. A third field 612 may represent the calling party IMSI, which may be populated using the IMSI object 508. A fourth field 613 may represent the calling party international mobile equipment identity (IMEI), which may be populated using another object (not shown). A fifth field 614 may represent the calling party cell ID, i.e. the identity of the closest radio access node or cell tower, which may be populated using the cell tower object 512. A sixth field 615 may represent a second, or called party identifier, e.g. a telephone number of the called user device to which the connection was directed. This may be populated using the international number object 504. A seventh field 616 may represent the called party IMSI, which may be populated using the IMSI object 508. An eighth field 617 may represent the called party international mobile equipment identity (IMEI), which may be populated using another object (not shown). A ninth field 618 may represent the called party cell ID, i.e. the identity of the closest radio access node or cell tower, which may be populated using the cell tower object 512. A tenth field 619 may represent the time of the call, which may comprise a date and start time of the call. An eleventh field 620 may represent the duration of the call, for example, in terms of hours, minutes and seconds.

According to some example embodiments, one or more further queries may be received to further refine the set of CDRs 604 to a reduced set. For example, the one or more further queries may identify one or more further case references 630, as will be explained below. Additionally, or alternatively, existing queries may be refined, for example to modify the time frame of the query in order to widen or narrow the time frame. This is indicated by reference number 640. For example, a graphical representation of the number of connections of the CDRs 604 within each hour of a given day may be shown in a histogram. The boundaries of the histogram may be modified to narrow or widen the time range.

Figure 7:
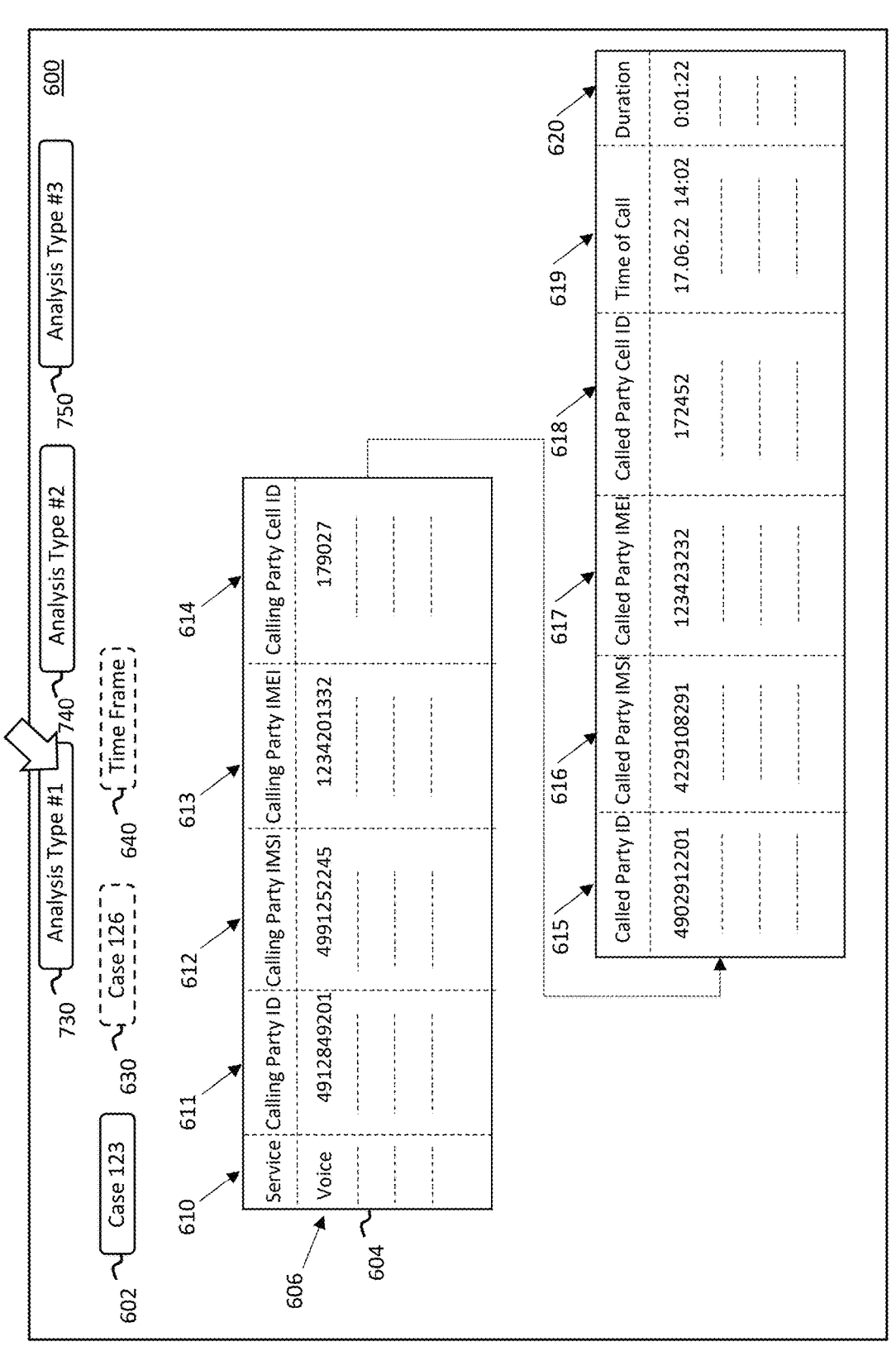
FIG. 7 is a schematic view of the FIG. 6 user interface including analysis buttons.

According to some example embodiments, the fifth operation 305 may involve selection of an analysis command associated with a predetermined type of analysis. Referring to FIG. 7, the UI shown in FIG. 6 now comprises first, second and third analysis buttons 730, 740, 750 representing respective analysis types. Selection of one of the first, second and third analysis buttons 730, 740, 750 is effective to perform respective analysis operations on the filtered set of call records 604. Selection may be by means of a single-click input, enabling rapid access to one or more analysis options.

For example, selection of the first analysis button 730 may be effective to perform so-called twin analysis, being a first example of an analysis type. In this respect, a known connection pattern indicative of suspicious activity occurs when the same in-cell/out-of-cell (or A number/B number, from the network perspective) combination exists in mirrored form within a predetermined time period, usually a few seconds, although the predetermined time period may be configurable. For example, a first party (the A number) may call a second party (the B number), and subsequently and within a relatively short time period, the second party calls the first party with the roles being swapped a number of times, for example at least once or twice. For example, this can be indicative of the first party coordinating with the second party, e.g. acting as a lookout whilst the second party is planning or performing criminal activity, with the two parties checking-in with each other periodically. Typically, the first and second parties will be in close proximity, e.g. in the same cell. Therefore, selection of the first analysis button 730 may result in the analysis application identifying, from the filtered set of call records 604, call connections in which the first and second parties swap roles, such that the calling party becomes the called party and the called party becomes the calling party, at least a predetermined number of times within a predetermined time period, the identified call connections comprising a resultant subset of the CDRs which may be presented on the UI 600 or a different UI.

Figures 8, 9:
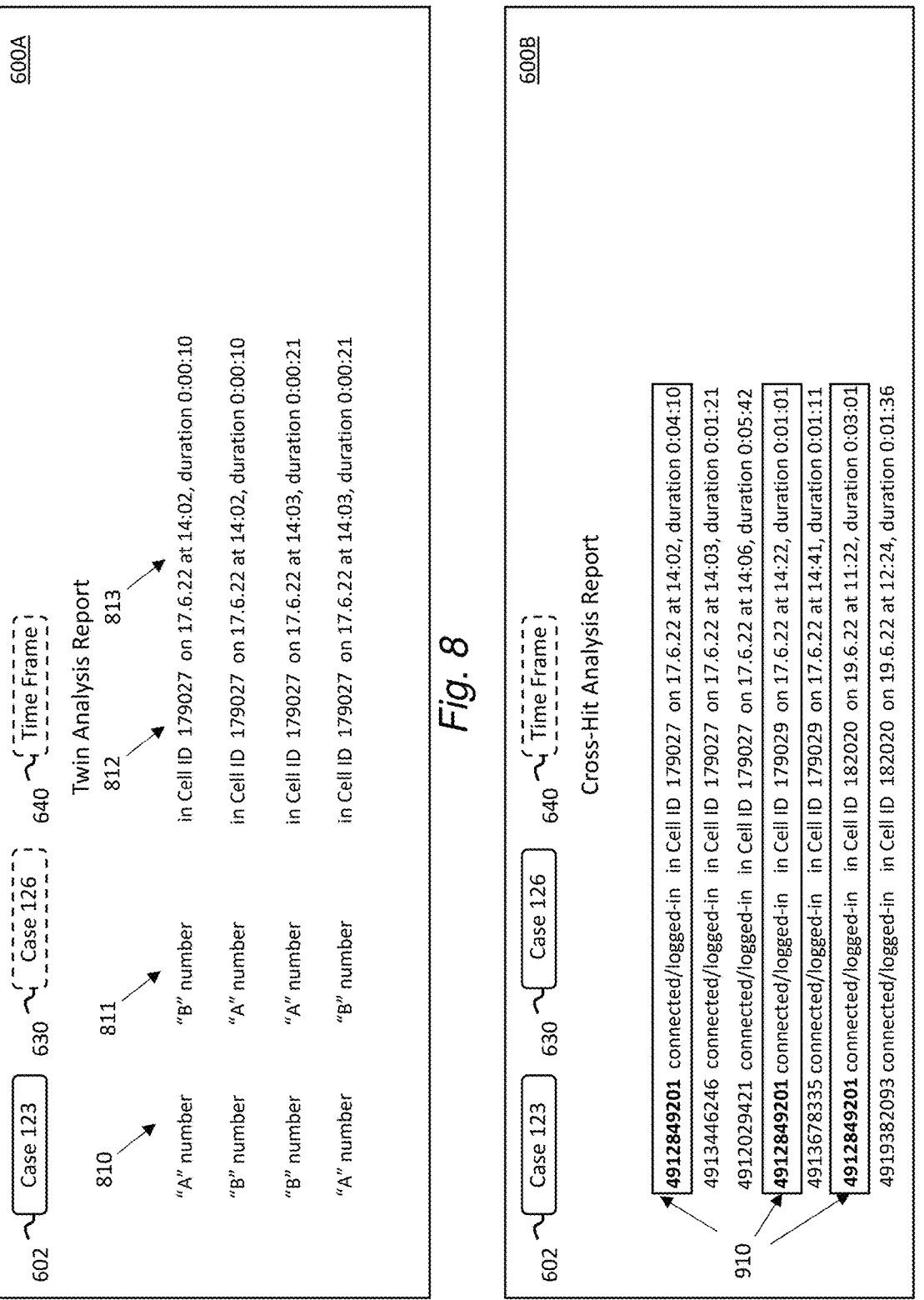
FIG. 8 is a schematic view of a user interface showing results from performance of a first analysis option.
FIG. 9 is a schematic view of another user interface showing results from performance of another analysis option.

For example, FIG. 8 shows an updated version 600A of the UI 600 in which performance of a twin analysis command, i.e. by selection of the first analysis button 730, has identified from a huge number of CDRs within a filtered first subset of CDRs evidence of twin activity. For example, the twin analysis may look for CDRs in which first and second parties roles swap at least two times within a predetermined window and the associated user devices are within the same or neighbouring cell IDs. These parameters may be re-configurable as required. As shown in FIG. 8, two telephone numbers 810, 811 have been identified which are referred to respectively as the "A" number and the "B" number which reflects how they are recorded by the network; related information includes the cell ID 812 which indicates that the user devices are relatively close to one another and timing information 813 indicative of the times of the calls and their respective durations. The first two rows indicate different legs of a first call; that is the first row indicates a first leg between the "A" number, or in-cell number, from the network perspective, and the second row indicates a second leg between the "B" number, or out-of-cell number, from the network perspective. The correspondence between their respective durations indicate that they belong to the same call. The third and fourth rows indicate a swapping of roles within a matter of seconds from one another. This needle-in-a-haystack approach enables the analyst to forward this information to the appropriate requesting party, under the terms of the appropriate court order.

Alternatively, or additionally, by means of selection of one or both of the two telephone numbers, through any suitable means (e.g. a mouse click or similar), subscriber object contact details may efficiently be retrieved from the object-relational model stored on the database. This may reveal the name, address and other information relating to the caller and/or called party which can also be provided to the appropriate requesting party. To obtain this level of detail may require certain access privileges, e.g. administrator only.

According to another example, which may be considered additionally or alternatively to the above, selection of a second analysis button 740 in FIG. 7 may be effective to perform so-called cross-hit analysis, being another example of an analysis type. In this respect, it may be the case that two investigations following, for example, two different crimes or crime patterns occurring at different times and possibly in different locations may be connected. For example, investigators may note or be told of a same or similar suspect description, vehicle description and/or modus operandi. For example, the event type may be the same, e.g. carjacking. This being the case, investigators may want to investigate using CDRs whether the same telephone number or user device was in the vicinity of the respective events at the respective times.

As such, prior to selection of the second analysis button 740, the analysis application may receive a second query relating to a second investigation. For example, this may be by means of specifying a second case reference 630 for which refer to FIG. 6. The case reference 630 may comprise at least a second location identifier, e.g. cell ID or group of cell IDs if the investigation is to cover a wider area, and a second time period. Alternatively, or additionally, the case reference 630 may refer to a file, e.g. an XML or similar file, identifying an already-gathered list of raw CDR data for the second investigation, which may then be ingested as before for populating the object-relational model and storing in the database.

Upon selection of the second analysis button 740, it is determined if there is at least one party identifier, e.g. telephone number (e.g. IMSI) and/or user device (e.g. IMEI), which is usually the caller or the A-number (in-cell number), that is common to both the queries, that is the effective first and second subsets of data produced from running the first and second queries or case references 602, 630 in this case. One or more CDRs which include the common telephone number(s) and/or user device(s) may be presented on an updated version 600B of the UI, as shown in FIG. 9. As will be seen in FIG. 9, seven entries have been produced based on the first and second case references 602, 630 and it is shown using the bounding boxes 910 that a common A-number, shown in bold, was identified from the CDRs responsive to the first query 602 (where the location of interest includes cell IDs 179027 and 179029) and the second query 630 (where the location of interest includes cell ID 182020). Thus, a telephone number, in this case 4912849201, is identified as potentially belonging to a suspect for both cases.

As before, by means of selection of the bold telephone number, through any suitable means (e.g. a mouse click or similar) subscriber object contact details May efficiently be retrieved from the object-relational model stored on the database. This may reveal the name, address and other information relating to the associated party which can also be provided to the appropriate requesting party. To obtain this level of detail may require certain access privileges, e.g. administrator only.

According to another example, which may be considered additionally or alternatively to the above, selection of the third analysis button 740 in FIG. 7 may be effective to perform so-called subscriber identity module (SIM) swap analysis, being another example of an analysis type. In this respect, it is known that criminals may tend to conceal their identity and/or movements by changing a SIM card used in the same user device over a period of time. Thus, this form of analysis looks within the subset or subsets of data produced from running the one or more queries in order to identify CDRs in which a user subscriber identifier, e.g. IMSI, for the calling or called party changes for a particular user device identifier, e.g. IMEI. This may be within the predetermined time period specified in the one or more queries. The analysis may look for just one change or at least a predetermined number of changes within the predetermined time period.

In some examples, the analysis may be based on a pattern and/or a frequency of changes within the predetermined time period, and/or network parameters or conditions, such as network stability, traffic, and/or bandwidth within a region. For example, if the network stability does not satisfy some threshold level, the switching may be resulting from or attributed to compromised network quality or conditions rather than an entity concealing identity and/or movements. In some examples, the analysis may be based on machine learning, such as, a LLM (large language model).

According to another example, which may be considered additionally or alternatively to the above, selection of another analysis button (not shown) may be effective to display a two-dimensional graphic, e.g. map, indicative of a path taken by a calling party or called party over a plurality of time identifiers as reflected in the CDRs. At a coarse level, different cell IDs encountered by a user device over a period of time may be indicative of a general path of travel of a user associated with that user device. As will be known, it is possible to determine a more accurate location of a user device using signals from multiple network access nodes, e.g. cell towers or base stations. If such information is available within the CDRs, estimating a distance between the user device and three or more base stations of known respective positions allows multilateration techniques to be employed. Therefore, where a party is considered a party-of-interest, possibly because they are identified by investigators, and/or have been identified in one or more of the above analysis types, it may be useful to understand their path of travel over a period of time prior to and/or subsequent to a time period of interest, e.g. when a crime took place. This may enable investigators to confirm or eliminate the party-of-interest as a suspect. For example, if a party-of-interest is identified as being within the same cell ID as where a crime took place, but the direction and/or velocity of the user device is inconsistent with what one would expect, then investigators may decide to downgrade or eliminate that party of interest. Multiple parties-of-interest can be visualised on a common map in some cases, i.e. to identify the party whose direction and/or velocity is most consistent with the location and/or time of the crime.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A computer-implemented method, wherein the method is performed using one or more processors, the method comprising:

providing one or more raw datasets representing CDRs (Call Data Records);

reformatting the one or more raw datasets, the reformatting comprising removing any null entries from the one or more raw datasets;

processing the raw datasets to generate an object-relational model comprising a plurality of objects, each object having an object type and properties of the respective object type, and links defining a relationship between the objects, the generated object-relational model being stored as an object-relational database, wherein the processing of the raw datasets comprises reformatting the one or more raw datasets, harmonizing the raw datasets, and enriching the raw datasets;

receiving a first query comprising, for at least one object type of the object-relational model, at least a first property;

applying the first query to the stored object-relational model to generate a first subset of the CDRs;

receiving a second query comprising, for at least one object type of the object-relational model, at least a second property or a modification to the first property;

applying the second query to the stored object-relational model to generate a second subset of the CDRs;

responsive to selection of a first analysis command, performing a predetermined first type of analysis associated with the first analysis command on the first subset of CDRs and the second subset of CDRs to produce a first resultant subset of the CDRs, wherein producing the first resultant subset of the CDRs is based on different CDRs having a mirrored pattern over a period of time, the mirrored pattern comprising mirrored attribute identifiers under swapped attributes of the different CDRs, the different CDRs being selected from the first subset and the second subset;

responsive to selection of a second analysis command, performing a second type of analysis on the first subset of CDRs and the second subset of CDRs to produce a second resultant subset of the CDRs, wherein producing the second resultant subset of the CDRs is based on a frequency of change in a first identifier of the first subset or a second identifier of the second subset of CDRs;

displaying the first subset, the second subset, or a resultant subset of the CDRs following the first analysis command or the second analysis command on the user interface; and responsive to selection of a third analysis command, performing a third type of analysis on the first subset of CDRs and the second subset of CDRs to generate a map comprising a plurality of paths corresponding to a plurality of entities.

2. The computer-implemented method according to claim 1, wherein the object-relational model comprises a call connection object, the call connection object defining properties of call connections between pairs of devices including a first party and a second party.

3. The computer-implemented method according to claim 2, wherein the properties of call connections between pairs of devices include a first party identifier, a first party location, a second party identifier, a second party location and a time identifier for the call connection.

4. The computer-implemented method according to claim 3, wherein the first party location and second party location correspond to a radio access node identifier.

5. The computer-implemented method according to claim 3, wherein the first party identifier and the second party identifier comprise respective telephone numbers, and wherein the object-relational model further comprises a subscriber object linked to the call connection object, the subscriber object providing contact details of subscribers associated with the respective telephone numbers.

6. The computer implemented method according to claim 5, further comprising receiving selection of one of the first party identifier and the second party identifier from the resultant subset of the CDRs, retrieving from the subscriber object contact details corresponding to the selection and displaying the contact details on the user interface.

7. The computer-implemented method according to claim 3, wherein the received first query specifies at least a first location identifier and a first time period and wherein applying the first query comprises determining call connections in which:

at least one of the first party location and the second party location correspond to the at least first location identifier specified in the first query; and the time identifier is within the first time period specified in the first query.

8. The computer-implemented method according to claim 7, wherein performing the predetermined type of analysis comprises identifying, from the first subset of the CDRs, call connections in which the first party and the second party swap roles, such that:

for a first call connection over a first time period, the first party is a calling or in-cell party and the second party is a called or out-of-cell party, and for a second call connection over a second time period, the second party is the calling or in-cell party and the first party is the out-of-cell or called party, wherein the second time period starts within a predetermined time after the end of the first time period, the identified call connections comprising the resultant subset of the CDRs.

9. The computer-implemented method according to claim 8, wherein performing the predetermined type of analysis further comprises identifying, from the first subset of the CDRs, call connections in which the first party location and the second party location correspond to a common radio access node or geographically neighbouring radio access nodes.

10. The computer-implemented method according to claim 1, wherein the object-relational model comprises a call connection object, the call connection object defining properties of call connections initiated by at least a first device associated with a first party and the properties of call connections include at least a first party identifier, a first party location and a time identifier for the call connection, wherein:

the received first query relates to a first investigation, the first query specifying at least a first location identifier and a first time period;

applying the first query comprises determining a first subset of the CDRs comprising call connections in which:

the first party location matches the at least first location identifier; and the time identifier is within the first time period.

11. The computer-implemented method according to claim 10, further comprising:

receiving a second query relating to a second investigation, the second query specifying at least a second location identifier and a second time period and wherein:

applying the second query comprises determining a second subset of the CDRs comprising call connections in which:

the first party location matches the at least second location identifier; and the time identifier is within the second time period.

12. The computer-implemented method according to claim 11, wherein performing the predetermined type of analysis comprises identifying, from the first subset of the CDRs and the second subset of the CDRs, call connections having at least one of a party identifier and user device identifier that is common to both the first and second subsets of the CDRs, the identified at least one call connection comprising the resultant subset of the CDRs.

13. The computer-implemented method according to claim 11, wherein the first and second investigations correspond to a common event type.

14. The computer implemented method of claim 1, wherein the predetermined type of analysis is based on a pattern and a frequency of changes to the properties within a predetermined time period.

15. The computer implemented method of claim 1, wherein the predetermined type of analysis is based on a network stability or a network bandwidth associated with the first subset of CDRs.

16. The computer implemented method of claim 1, wherein the generating the map is based on multilateration.

17. The computer implemented method of claim 1, wherein the map identifies directions and velocities corresponding to the plurality of paths.

18. A non-transitory computer readable medium comprising instructions that, when executed, cause one or more processors of a computing system to perform:

providing one or more raw datasets representing CDRs (Call Data Records);

reformatting the one or more raw datasets, the reformatting comprising removing any null entries from the one or more raw datasets;

processing the raw datasets to generate an object-relational model comprising a plurality of objects, each object having an object type and properties of the respective object type, and links defining a relationship between the objects, the generated object-relational model being stored as an object-relational database;

receiving a first query comprising, for at least one object type of the object-relational model, at least a first property;

applying the first query to the stored object-relational model to generate a first subset of the CDRs;

receiving a second query comprising, for at least one object type of the object-relational model, at least a second property or a modification to the first property;

applying the second query to the stored object-relational model to generate a second subset of the CDRs;

responsive to selection of a first analysis command, performing a predetermined first type of analysis associated with the first analysis command on the first subset of CDRs and the second subset of CDRs to produce a first resultant subset of the CDRs, wherein producing the first resultant subset of the CDRs is based on different CDRs having a mirrored pattern over a period of time, the mirrored pattern comprising mirrored attribute identifiers under swapped attributes of the different CDRs, the different CDRs being selected from the first subset and the second subset;

responsive to selection of a second analysis command, performing a second type of analysis on the first subset of CDRs and the second subset of CDRs to produce a second resultant subset of the CDRs, wherein producing the second resultant subset of the CDRs is based on a frequency of change in a first identifier of the first subset or a second identifier of the second subset of CDRs;

displaying the first subset, the second subset, or a resultant subset of the CDRs following the first analysis command or the second analysis command on the user interface; and responsive to selection of a third analysis command, performing a third type of analysis on the first subset of CDRs and the second subset of CDRs to generate a map comprising a plurality of paths corresponding to a plurality of entities.

19. An apparatus comprising:

one or more processors; and a memory storing instructions that, when executed by the one or more processors, cause the system to perform:

providing one or more raw datasets representing CDRs (Call Data Records);

reformatting the one or more raw datasets, the reformatting comprising removing any null entries from the one or more raw datasets;

processing the raw datasets to generate an object-relational model comprising a plurality of objects, each object having an object type and properties of the respective object type, and links defining a relationship between the objects, the generated object-relational model being stored as an object-relational database;

receiving a first query comprising, for at least one object type of the object-relational model, at least a first property;

applying the first query to the stored object-relational model to generate a first subset of the CDRs;

receiving a second query comprising, for at least one object type of the object-relational model, at least a second property or a modification to the first property;

applying the second query to the stored object-relational model to generate a second subset of the CDRs;

responsive to selection of a first analysis command, performing a predetermined first type of analysis associated with the first analysis command on the first subset of CDRs and the second subset of CDRs to produce a first resultant subset of the CDRs, wherein producing the first resultant subset of the CDRs is based on different CDRs having a mirrored pattern over a period of time, the mirrored pattern comprising mirrored attribute identifiers under swapped attributes of the different CDRs, the different CDRs being selected from the first subset and the second subset;

responsive to selection of a second analysis command, performing a second type of analysis on the first subset of CDRs and the second subset of CDRs to produce a second resultant subset of the CDRs, wherein producing the second resultant subset of the CDRs is based on a frequency of change in a first identifier of the first subset or a second identifier of the second subset of CDRs;

displaying the first subset, the second subset, or a resultant subset of the CDRs following the first analysis command or the second analysis command on the user interface; and responsive to selection of a third analysis command, performing a third type of analysis on the first subset of CDRs and the second subset of CDRs to generate a map comprising a plurality of paths corresponding to a plurality of entities.

* * * * *